United States Patent
Tucker et al.

(10) Patent No.: US 7,842,631 B2
(45) Date of Patent: Nov. 30, 2010

(54) GLASS COMPOSITIONS WITH HIGH SOFTENING POINT TEMPERATURES

(75) Inventors: Phillip James Tucker, Denver, CO (US); Elam Leed, Pine, CO (US)

(73) Assignee: Johns Manville, Denver, CO (US)

( * ) Notice: Subject to any disclaimer, the term of this patent is extended or adjusted under 35 U.S.C. 154(b) by 541 days.

(21) Appl. No.: 11/906,906

(22) Filed: Oct. 4, 2007

(65) Prior Publication Data

US 2009/0092775 A1    Apr. 9, 2009

(51) Int. Cl.
*C03C 3/091* (2006.01)
*C03C 13/06* (2006.01)

(52) U.S. Cl. .............................. 501/66; 501/36; 501/35; 501/67

(58) Field of Classification Search .................... 501/35, 501/36, 66, 67
See application file for complete search history.

(56) References Cited

U.S. PATENT DOCUMENTS 5,108,957 A * 4/1992 Cohen et al. .................. 501/35
5,523,264 A * 6/1996 Mattson ........................ 501/35
5,523,265 A * 6/1996 Rapp et al. .................... 501/35
6,107,224 A * 8/2000 Xu et al. ........................ 501/35
6,794,321 B2 * 9/2004 Bauer ........................... 501/35
2002/0100517 A1* 8/2002 Somerville et al. .......... 138/148
2005/0221705 A1* 10/2005 Hitch .......................... 442/180

FOREIGN PATENT DOCUMENTS

| DE | 4418728 A1 * | 1/1996 |
| JP | 2006312584 A * | 11/2006 |
| WO | WO 9307741 A1 * | 4/1993 |
| WO | WO 9532925 A1 * | 12/1995 |
| WO | WO 9532926 A1 * | 12/1995 |

* cited by examiner

*Primary Examiner*—Karl E Group
*Assistant Examiner*—Elizabeth A Bolden
(74) *Attorney, Agent, or Firm*—Robert D. Touslee

(57) ABSTRACT

Provided are glass compositions with higher softening point temperatures than conventional glasses, which improve flame penetration test performance of flexible duct insulation. In particular, the glass compositions have a softening point in the range of about 1230-1276° F., a log-3 viscosity temperature in the range of about 1802-1879° F., and a temperature difference between log-3 viscosity and liquidus temperatures of at least 150° F. These glasses are specially formulated to increase softening point while only minimally increasing log-3 viscosity temperature, so as to allow fiber insulation manufacturing without requiring increased energy use.

13 Claims, 1 Drawing Sheet

GLASS COMPOSITIONS WITH HIGH SOFTENING POINT TEMPERATURES

FIELD OF ART

The present disclosure relates to glass compositions with higher softening point temperatures than conventional glasses. More specifically, glass compositions with higher softening point temperatures than conventional glasses can improve flame penetration test performance of flexible duct insulation. These glasses achieve sufficiently high softening point to improve flame penetration while maintaining relatively low temperatures for fiber forming for ease of manufacturing.

BACKGROUND

Flexible duct insulation made with a rotary fiberizing process, must pass flame penetration testing in which a 24"×24" piece of finished duct is exposed to open flame in the top center portion of a furnace at a nominal temperature at the start of testing of 1425° F.±25° F. The target temperature is measured by an array of thermocouples mounted in the center of the test apparatus with refractory insulation covering the top of the gas furnace. Once the target temperature is achieved in the center of the top part of the furnace and held in this range for 15 minutes, the refractory cover is removed and is replaced with the test sample, attached to a 24"×24" angle iron frame. An 8-pound test weight with a surface area exposure of 1"×4" is set on the top surface of the test sample, at which time the test timing is started. The sample must resist any visible flame penetration as well as support the test weight without it falling through the sample for a minimum of 30 minutes to pass the test. Three consecutive samples must pass the flame penetration test in the test apparatus described above for product to be certified by Underwriters Laboratories (UL) as meeting the flame penetration test requirement.

Test failures may be caused by a combination of multiple factors, including, for example, product density, product density distribution, fiber length, fiber diameter, glass chemistry and properties, design of the duct, as well as other factors. Improvement in any of these areas to provide a duct insulation which meets all test requirements would be of great value to the industry. To help support the test weight, a woven scrim of e-glass fiber is often used as a part of the flexible duct product. The woven scrim of e-glass fiber is undesirable because of material and duct fabrication costs.

Current glass often used to manufacture current duct insulation has a log-3 viscosity temperature in the range of about 1820° F. and a softening point temperature of about 1200-1210° F. As used herein, "log-3 viscosity" refers to the temperature at which the viscosity of a glass is 1,000 poise. This viscosity is representative of the fiber-forming viscosity and hence the temperature represents the approximate operating temperatures of the rotary fiberization process. Softening point is defined by ASTM C338-93 (2003) as the temperature at which a fiber with an average diameter in the range of 0.55-0.75 mm (+0.01 mm) and length 235 mm (±1 mm) will elongate under its own weight at a rate of 1 mm/minute. This corresponds to an approximate viscosity of $10^{7.60}$ to $10^{7.65}$ poise. Low softening point temperature in conventional glass is believed to contribute to flame penetration test failures. Generally, a glass composition change that increases softening point also increases log-3 viscosity by a similar or greater magnitude. Liquidus is defined by ASTM C829-81 (2005) and in ASTM C162-05 as the maximum temperature at which equilibrium exists between molten glass and its primary crystalline phase. Effectively, it is the temperature at which the glass devitrifies, or first forms crystals, undesirable in glass fiber-forming processes.

SUMMARY

The present disclosure provides glass compositions which overcome the deficiencies of the prior compositions and provide improved flame penetrations test results. The primary means of achieving this improvement is through increase in softening point. Increasing the softening point with minimal increases in log-3 viscosity results in a steeper viscosity-temperature curve, as illustrated in FIG. 1, meaning the presently disclosed glass compositions also achieve higher softening point without significantly increasing fiber forming temperatures. Maintaining low log-3 viscosity temperatures allows lower fiber forming temperatures, which results in lower energy usage for fiberization and longer equipment life for parts such as rotary fiberization discs.

Specifically, provided is a glass composition having a softening point in the range of about 1230-1276° F., a log-3 viscosity temperature in the range of about 1802-1879° F., and a liquidus temperature in the range of about 1635-1780° F. In an embodiment, the glass composition comprises about 55.0-62.2 weight % $SiO_2$; about 12.9-15.5 weight % $Na_2O$; about 8.0-14.2 weight % $B_2O_3$; about 4.0-8.0 weight % CaO; about 0.9-5.6 weight % $Al_2O_3$; about 3.0-5.0 weight % MgO; about 0.2-1.4 weight % $K_2O$, and about 0.0%-1.0% $F_2$.

Among other factors, it has been found that glass compositions with the presently disclosed softening point and log-3 viscosity temperature, when used to make duct insulation, exhibit improved flame penetrations test results. It is believed that the increased softening point of the presently disclosed glass compositions, as compared to conventional glass compositions, contributes to the improved flame penetrations test results. The presently disclosed glass compositions may also be described in terms of the compositional ranges of the constituents of the glass compositions. Without wishing to be bound by any theory, it is believed that the unique combinations of glass ingredients disclosed here result in a sufficiently high softening point to improve flame penetration, without increasing log-3 viscosity to cause excessively high fiber forming temperatures, and while maintaining a temperature difference between log-3 viscosity and liquidus temperatures of at least 150° F., to prevent devitrification from occurring at normal glass process temperatures.

DETAILED DESCRIPTION

Figure 1:
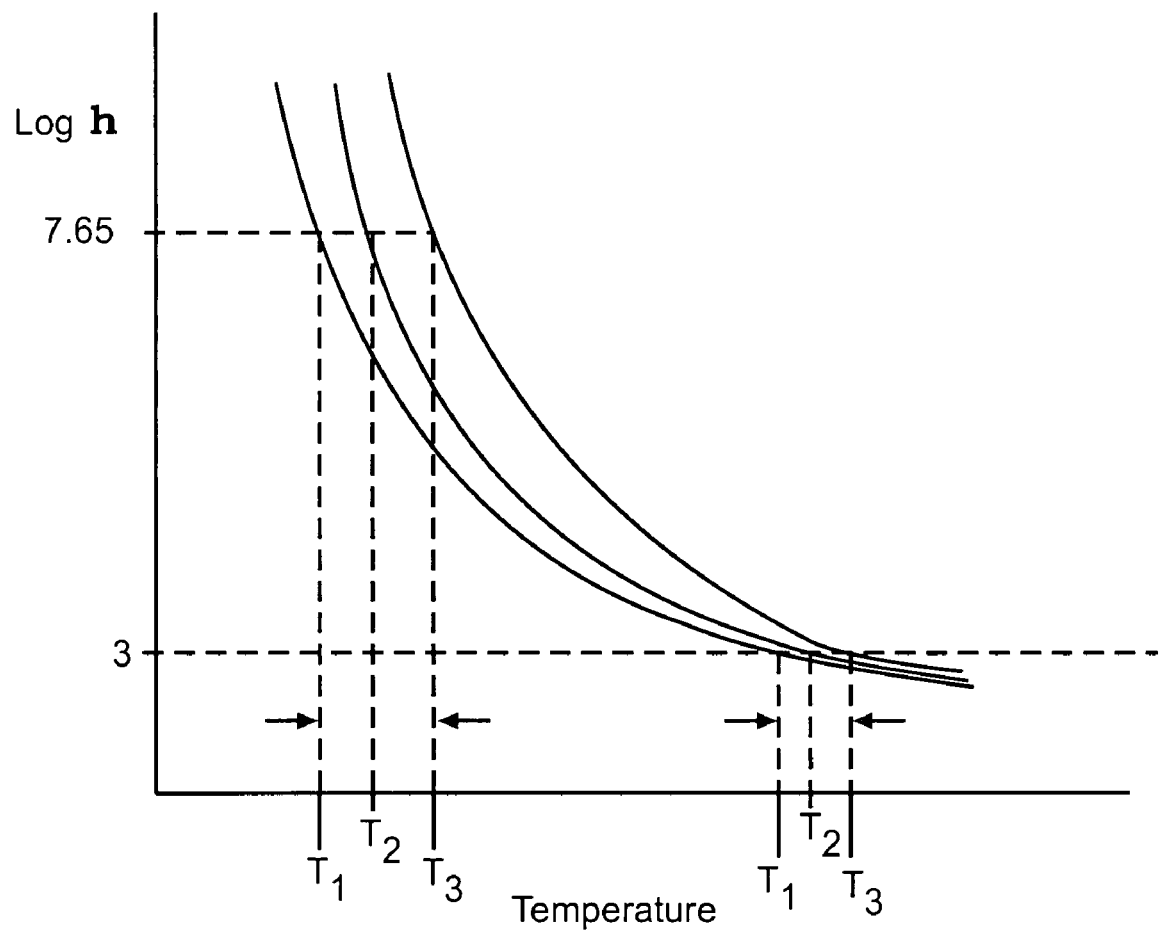
FIG. 1 shows a graph of viscosity-temperature curves for various glass compositions.

Accordingly, provided is a glass composition having a softening point in the range of about 1230-1276° F., a log-3 viscosity temperature in the range of about 1802-1879° F., and a liquidus temperature in the range of about 1635-1780° F. The glass composition can comprise about 55.0-62.2 weight % $SiO_2$; about 12.9-15.5 weight % $Na_2O$; about 8.0-14.2 weight % $B_2O_3$; about 4.0-8.0 weight % CaO; about 0.9-5.6 weight % $Al_2O_3$; about 3.0-5.0 weight % MgO; about 0.2-1.4 weight % $K_2O$, and about 0.0-1.0% $F_2$. The glass composition may be used to form a glass fiber product. An insulation duct may comprise a tubular wall and a layer of the glass fiber product wrapped about the wall.

In an embodiment, the glass composition comprises a softening point in the range of about 1230-1253° F., a log 3 viscosity temperature in the range of about 1802-1853° F., and a liquidus temperature in the range of about 1635-1668° F. The glass composition may comprise about 55.0-57.2 weight % $SiO_2$; about 13.9-15.0 weight % $Na_2O$; about 13.1-14.2 weight % $B_2O_3$; about 4.0-6.0 weight % CaO; about 5.0-5.6 weight % $Al_2O_3$; about 3.0-4.0 weight % MgO; and about 1.2-1.4 weight % $K_2O$. The glass composition can further comprise about 0.05-0.06 weight % $Fe_2O_3$ and/or about 0.02-0.03 weight % $TiO_2$. The glass composition can have a liquidus temperature in the range of about 1635-1668° F. The glass composition can have a density in the range of about 2.51-2.53 g/cm$^3$.

In an embodiment, the glass composition comprises a softening point in the range of about 1231-1276° F., a log-3 viscosity temperature in the range of about 1819-1879° F., and a liquidus temperature in the range of about 1674-1780° F. The glass composition may comprise about 56.9-62.0 weight % $SiO_2$; about 12.9-15.5 weight % $Na_2O$; about 8.0-12.0 weight % $B_2O_3$; about 7.0-8.0 weight % CaO; about 1.0-5.0 weight % $Al_2O_3$; about 3.9-5.0 weight % MgO; and about 0.2-1.3 weight % $K_2O$. The glass composition can further comprise up to about 1.0 weight % $F_2$; about 0.05-0.08 weight % $Fe_2O_3$; and/or about 0.02-0.03 weight % $TiO_2$. The glass composition can have a liquidus temperature in the range of about 1674-1780° F. The glass composition can have a density in the range of about 2.53-2.55 g/cm$^3$.

In an embodiment, the glass composition comprises a softening point in the range of about 1242-1253° F., a log-3 viscosity temperature in the range of about 1830-1859° F., and a liquidus temperature in the range of about 1661-1725° F. The glass composition may comprise about 58.5-61.7 weight % $SiO_2$; about 14.0-15.0 weight % $Na_2O$; about 9.3-10.5 weight % $B_2O_3$; about 6.9-7.9 weight % CaO; about 0.9-4.0 weight % $Al_2O_3$; about 4.3-4.7 weight % MgO; and about 0.2-1.0 weight % $K_2O$. The glass composition can further comprise about 0.1-0.7 weight % $F_2$; about 0.03-0.07 weight % $Fe_2O_3$; and/or about 0.02-0.03 weight % $TiO_2$. The glass composition can have a liquidus temperature in the range of about 1661-1725° F.

In the presently disclosed glass composition ranges, certain specific changes were made from prior compositions in order to attain desired glass property targets. In a simplification of glass theory, glass is composed of glass forming oxides ($SiO_2$, $B_2O_3$), glass intermediates ($Al_2O_3$), and glass modifiers (CaO, MgO, $Na_2O$, $K_2O$, $F_2$). Continuing with this simplified description, glass forming oxides provide structure and strength to glass, modifiers provide other properties such as glass durability, or fluxing to help melt the glass at lower process temperatures, and intermediates provide some characteristics of both modifiers and glass formers. Through these primary roles, each of the glass oxides affects other glass properties in various ways. For example, increasing $SiO_2$ or $Al_2O_3$ in glasses causes log-3 viscosity to increase, while increasing CaO, MgO, $Na_2O$, $K_2O$, or $B_2O_3$ causes log-3 viscosity to decrease. Increasing CaO, MgO, or $Al_2O_3$ in glasses causes liquidus temperature to increase, while increasing $B_2O_3$, $Na_2O$, or $K_2O$ causes liquidus temperature to decrease. Finally, increasing $Na_2O$, $K_2O$, or $F_2$ in glasses strongly depresses the softening point, while other oxides have a much smaller effect on softening point. With these relationships in mind, in order to decrease softening point with minimal increases in log-3 viscosity, and while maintaining a low liquidus temperature, fluxing oxides $Na_2O$, $K_2O$, and $F_2$ were decreased, $B_2O_3$, CaO, and MgO were increased, and $Al_2O_3$ was decreased.

The presently disclosed glass compositions, with increased softening points, overcome the deficiencies of prior glass compositions, as duct insulation formed from the presently disclosed fiberized glass compositions using rotary fiberization methods exhibit improved flame penetrations test results over flame penetrations test results of prior glass compositions.

The following illustrative examples are intended to be non-limiting.

EXAMPLES

In an attempt to improve flame penetration test pass rates, a series of experimental glass compositions were developed, with the objective of increasing glass softening point, moving the glass softening point closer to the flame penetration test temperature, thereby minimizing melting and deformation of the fibers during the test and preventing flame penetration. To improve flame penetration characteristics, two developmental paths were followed. Initially, glasses were developed to increase glass softening point while attempting to maintain a constant log-3 viscosity temperature of about 1820° F. It was intended the glasses would be utilized directly in existing melting, conditioning, and fiberizing processes. The second developmental path sought out to increase the glass softening point while simultaneously allowing a small increase in log-3 viscosity temperatures. The increases in log-3 viscosity were kept small enough to only require minimal and manageable changes to the rotary fiberization process without significantly limiting disc life and throughput and without significantly increasing fiberizing energy demand.

The first composition series was developed by making experimental deviations from high boron glass. The compositions were developed using common glass making raw materials such as, for example, sand, soda ash, 5-mol borax, dolomitic lime, and feldspathic materials such as, for example, feldspar or nepheline syenite. By increasing the softening point of the glass by an average of 36 degrees F. over conventional glass, in combination with use of a light-weight E-glass scrim, the glass produced exhibited a statistically significant (95% confidence) improvement in Flex Glas™ flame penetration test pass rate of between 60 and 75%, over product made with conventional glass, also utilizing light-weight E-glass scrim. Also, by increasing the softening point without altering the log-3 viscosity temperature, no design changes were required to run the glass using normal production equipment and running the fiberization trials within normal process temperatures and settings. Table 1 provides a detailed analysis of the first composition series glasses formed, while Table 2 provides a generalized description of the first composition series glasses formed.

TABLE 1

| Glass Oxide | Ex. 1 | Ex. 2 | Ex. 3 | Ex. 4 | Ex. 5 | Ex. 6 |
| --- | --- | --- | --- | --- | --- | --- |
| $SiO_2$ (wt %) | 57.1 | 56.7 | 57.2 | 56.6 | 55.5 | 56.3 |
| $Na_2O$ (wt %) | 14.2 | 13.9 | 14.1 | 14.4 | 14.6 | 14.4 |

TABLE 1-continued

| Glass Oxide | Ex. 1 | Ex. 2 | Ex. 3 | Ex. 4 | Ex. 5 | Ex. 6 |
|---|---|---|---|---|---|---|
| B₂O₃ (wt %) | 13.18 | 13.2 | 13.8 | 13.9 | 14.2 | 14.0 |
| CaO (wt %) | 4.97 | 5.78 | 5.21 | 5.29 | 5.73 | 5.43 |
| Al₂O₃ (wt %) | 5.55 | 5.51 | 5.12 | 5.09 | 5.00 | 5.06 |
| MgO (wt %) | 3.66 | 3.5 | 3.21 | 3.25 | 3.53 | 3.36 |
| K₂O (wt %) | 1.25 | 1.31 | 1.24 | 1.27 | 1.24 | 1.25 |
| Fe₂O₃ (wt %) | 0.058 | 0.058 | 0.054 | 00.52 | 0.056 | 0.053 |
| TiO₂ (wt %) | 0.02 | 0.03 | 0.03 | 0.03 | 0.02 | 0.03 |
| Log-3 Viscosity (° F.) | 1853 | 1838 | 1839 | 1826 | 1802 | 1812 |
| Softening Point (° F.) | 1253 | 1252 | 1244 | 1238 | 1230 | 1238 |
| Liquidus Temp. (° F.) | 1661 | 1668 | | 1635 | 1653 | 1647 |
| Density (g/cm³) | 2.5150 | 2.5203 | | | | |

TABLE 2

| Glass Oxide | Weight % |
|---|---|
| SiO₂ | 55.0-57.2 |
| Na₂O | 13.9-15.0 |
| B₂O₃ | 13.1-14.2 |
| CaO | 4.0-6.0 |
| Al₂O₃ | 5.0-5.6 |
| MgO | 3.0-4.0 |
| K₂O | 1.2-1.4 |

The second composition series involved increasing glass softening point through composition changes but allowing the log-3 viscosity to increase to about 1819-1879° F., while increasing softening point to about 1231-1276° F. The glasses of the second composition series provided increased flame penetration performance in modified rotary fiberization processes. A series of test melts were done to assure appropriate glass properties were attained. Tables 3 and 4 provides a detailed analysis of the second composition series glasses formed, while Table 5 provides a generalized description of the second composition series glasses formed.

TABLE 3

| Glass Oxide | Ex. 7 | Ex. 8 | Ex. 9 | Ex. 10 | Ex. 11 |
|---|---|---|---|---|---|
| SiO₂ (wt %) | 58.1 | 59.1 | 58.5 | 58.0 | 56.9 |
| Na₂O (wt %) | 15.3 | 14.3 | 14.8 | 15.4 | 15.2 |
| B₂O₃ (wt %) | 9.49 | 9.95 | 10.00 | 9.66 | 9.25 |
| CaO (wt %) | 7.25 | 7.37 | 7.42 | 7.46 | 7.88 |
| Al₂O₃ (wt %) | 4.58 | 4.02 | 4.03 | 4.18 | 4.95 |
| MgO (wt %) | 4.01 | 4.10 | 4.17 | 4.14 | 4.45 |
| K₂O (wt %) | 1.18 | 1.02 | 0.96 | 1.03 | 0.25 |
| Fe₂O₃ (wt %) | 0.059 | 0.061 | 0.061 | 0.069 | 0.068 |
| TiO₂ (wt %) | 0.03 | 0.03 | 0.02 | 0.02 | 0.02 |
| F₂ (wt %) | 0.00 | 0.00 | 0.00 | 0.00 | 0.00 |
| Log-3 Viscosity (° F.) | 1843 | 1860 | 1843 | 1836 | 1819 |
| Softening Point (° F.) | 1243 | 1260 | 1253 | 1242 | 1231 |
| Liquidus Temp. (° F.) | 1674 | 1705 | 1704 | 1708 | 1747 |
| Density (g/cm³) | | | | | 2.5495 |

TABLE 4

| Glass Oxide | Ex. 12 | Ex. 13 | Ex. 14 | Ex. 15 | Ex. 16 |
|---|---|---|---|---|---|
| SiO₂ (wt %) | 59.6 | 61.6 | 58.1 | 58.4 | 62 |
| Na₂O (wt %) | 13.3 | 13.4 | 14.1 | 14.7 | 12.9 |
| B₂O₃ (wt %) | 11.2 | 8.88 | 10.00 | 9.95 | 11.0 |
| CaO (wt %) | 7.41 | 7.85 | 7.47 | 7.33 | 7.78 |
| Al₂O₃ (wt %) | 3.25 | 2.98 | 4.51 | 3.99 | 1.2 |
| MgO (wt %) | 4.31 | 3.95 | 4.65 | 4.57 | 4.71 |
| K₂O (wt %) | 0.78 | 0.71 | 1.08 | 0.95 | 0.27 |
| Fe₂O₃ (wt %) | 0.063 | 0.065 | 0.068 | 0.069 | 0.072 |
| TiO₂ (wt %) | 0.03 | 0.02 | 0.02 | 0.03 | 0.02 |
| F₂ (wt %) | 0.00 | 0.92 | 0.00 | 0.00 | 0.00 |
| Log-3 Viscosity (° F.) | 1864 | 1875 | 1865 | 1855 | 1879 |
| Softening Point (° F.) | 1268 | 1243 | 1255 | 1250 | 1276 |
| Liquidus Temp. (° F.) | 1728 | 1715 | 1780 | 1737 | |
| Density (g/cm³) | 2.5364 | 2.5400 | 2.5409 | 2.5433 | 2.5377 |

TABLE 5

| Glass Oxide | Weight % |
|---|---|
| SiO₂ | 56.9-62.0 |
| Na₂O | 12.9-15.5 |
| B₂O₃ | 8.0-12.0 |
| CaO | 7.0-8.0 |
| Al₂O₃ | 1.0-5.0 |
| MgO | 3.9-5.0 |
| K₂O | 0.2-1.3 |
| F₂ | 0.0-0.92 |

An additional series of melts were performed within the same composition range to further tune in desired glass properties. The formulations allowed the log-3 viscosity to increase to about 1830-1859° F. while increasing softening point to about 1242-1253° F. Table 6 provides a detailed analysis of the additional glasses formed, while Table 7 provides a generalized description of the additional glasses formed.

TABLE 6

| Glass Oxide | Ex. 17 | Ex. 18 | Ex. 19 | Ex. 20 | Ex. 21 | Ex. 22 |
|---|---|---|---|---|---|---|
| $SiO_2$ (wt %) | 61.7 | 61.4 | 58.5 | 59.6 | 60.4 | 61.4 |
| $Na_2O$ (wt %) | 15.00 | 14.4 | 14.40 | 14.40 | 14.30 | 14.00 |
| $B_2O_3$ (wt %) | 10.40 | 9.34 | 10.40 | 10.50 | 9.78 | 9.64 |
| CaO (wt %) | 6.95 | 7.45 | 7.02 | 7.04 | 7.85 | 7.68 |
| $Al_2O_3$ (wt %) | 0.99 | 1.94 | 3.92 | 2.93 | 2.25 | 2.02 |
| MgO (wt %) | 4.38 | 4.51 | 4.45 | 4.66 | 4.49 | 4.38 |
| $K_2O$ (wt %) | 0.23 | 0.47 | 0.96 | 0.72 | 0.54 | 0.49 |
| $Fe_2O_3$ (wt %) | 0.037 | 0.036 | 0.036 | 0.038 | 0.069 | 0.069 |
| $TiO_2$ (wt %) | 0.02 | 0.03 | 0.02 | 0.02 | 0.02 | 0.02 |
| $F_2$ (wt %) | 0.42 | 0.65 | 0.44 | 0.19 | 0.47 | 0.47 |
| Log-3 Viscosity (° F.) | 1835 | 1857 | 1853 | 1830 | 1837 | 1859 |
| Softening Point (° F.) | 1244 | 1245 | 1243 | 1242 | 1244 | 1253 |
| Liquidus Temp. (° F.) | 1661 | 1725 | 1703 | 1676 | 1703 | 1703 |

TABLE 7

| Glass Oxide | Weight % |
|---|---|
| $SiO_2$ | 58.5-61.7 |
| $Na_2O$ | 14.0-15.0 |
| $B_2O_3$ | 9.3-10.5 |
| CaO | 6.9-7.9 |
| $Al_2O_3$ | 0.9-4.0 |
| MgO | 4.3-4.7 |
| $K_2O$ | 0.2-1.0 |
| $F_2$ | 0.19-0.65 |

The average glass composition and glass properties of three process trial runs done at a production facility are shown in Table 8. The effect of the increased softening point resulted in statistical improvement in flame penetration testing pass rates in product produced during each of the three trials over pass rates of product made with conventional glasses.

TABLE 8

| Glass Oxide | Trial Glass 1 Average Values | Trial Glass 2 Average Values | Trial Glass 3 Average Values |
|---|---|---|---|
| $SiO_2$ (wt %) | 60.24 | 61.46 | 62.20 |
| $Na_2O$ (wt %) | 14.69 | 14.79 | 14.55 |
| $B_2O_3$ (wt %) | 9.66 | 9.24 | 9.14 |
| CaO (wt %) | 7.14 | 7.16 | 6.97 |
| $Al_2O_3$ (wt %) | 2.90 | 2.11 | 2.09 |
| MgO (wt %) | 4.18 | 4.31 | 4.17 |
| $K_2O$ (wt %) | 0.69 | 0.50 | 0.49 |
| $Fe_2O_3$ (wt %) | 0.053 | 0.052 | 0.051 |
| $TiO_2$ (wt %) | 0.028 | 0.026 | 0.030 |
| $F_2$ (wt %) | 0.55 | 0.46 | 0.42 |
| Log-3 Viscosity (° F.) | 1843.8 | 1850.5 | 1852.5 |
| Softening Point (° F.) | 1236.4 | 1240.4 | 1247.5 |
| Liquidus Temp. (° F.) | 1690.8 | 1669 | 1673.5 |
| Flame Test Pass Rate (% Improvement) | +0-70 | +0-100 | +50-100 |

While various embodiments have been described, it is to be understood that variations and modifications can be resorted to as will be apparent to those skilled in the art. Such variations and modifications are to be considered within the purview and scope of the claims appended hereto.

The invention claimed is:

1. A glass composition having comprising:
   about 55.0-62.2 weight % $SiO_2$
   about 12.9-15.5 weight % $Na_2O$;
   about 8.0-11.2 weight % $B_2O_3$
   about 4.0-8.0 weight % CaO;
   about 0.9-5.6 weight % $Al_2O_3$
   about 3.0-5.0 weight % MgO;
   about 0.2-1.4 weight % $K_2O$; and
   about 0.0-1.0 weight % $F_2$.
   a softening point in the range of about 1230-1276° F.;
   a log-3 viscosity temperature in the range of about 1802-1879° F.; and
   a liquidus temperature in the range of about 1635-1780° F.

2. The glass composition of claim 1, wherein a temperature difference between the log-3 viscosity and the liquidus temperature is at least 150° F.

3. A glass fiber insulation product comprising the glass composition of claim 1.

4. An insulation duct comprising:
   a tubular wall; and
   a layer of the glass fiber insulation product of claim 3 wrapped about the wall.

5. The glass composition of claim 1, comprising:
   a softening point in the range of about 1230-1253° F.;
   a log-3 viscosity temperature in the range of about 1802-1853° F.; and
   a liquidus temperature in the range of about 1635-1668° F.

6. The glass composition of claim 1, comprising:
   a softening point in the range of about 1231-1276° F.;
   a log-3 viscosity temperature in the range of about 1819-1879° F.; and
   a liquidus temperature in the range of about 1674-1780° F.

7. The glass composition of claim 6, comprising:
   about 56.9-62.0 weight % $SiO_2$;
   about 12.9-15.5 weight % $Na_2O$;
   about 8.0-11.2 weight % $B_2O_3$;
   about 7.0-8.0 weight % CaO;
   about 1.0-5.0 weight % $Al_2O_3$;
   about 3.9-5.0 weight % MgO; and
   about 0.2-1.3 weight % $K_2O$.

8. The glass composition of claim 7, further comprising:
   about 0.05-0.08 weight % $Fe_2O_3$; and
   about 0.02-0.03 weight % $TiO_2$.

9. The glass composition of claim 6, wherein the glass composition has a density in the range of about 2.53-2.55 g/cm³.

10. The glass composition of claim 1, comprising:
    a softening point in the range of about 1242-1253° F.;
    a log-3 viscosity temperature in the range of about 1830-1859° F.; and
    a liquidus temperature in the range of about 1661-1725° F.

11. The glass composition of claim 10, comprising:
    about 58.5-61.7 weight % $SiO_2$;
    about 14.0-15.0 weight % $Na_2O$;
    about 9.3-10.5 weight % $B_2O_3$;

about 6.9-7.9 weight % CaO;
about 0.9-4.0 weight % $Al_2O_3$;
about 4.3-4.7 weight % MgO; and
about 0.2-1.0 weight % $K_2O$.

12. The glass composition of claim 11, further comprising about 0.1-0.7 weight % $F_2$.

13. The glass composition of claim 11, further comprising:
about 0.03-0.07 weight % $Fe_2O_3$; and
about 0.02-0.03 weight % $TiO_2$.

* * * * *